United States Patent
Yang et al.

(10) Patent No.: US 10,044,063 B2
(45) Date of Patent: Aug. 7, 2018

(54) COPOLYMERS OF PEO AND FLUORINATED POLYMERS AS ELECTROLYTES FOR LITHIUM BATTERIES

(71) Applicant: Seeo, Inc., Hayward, CA (US)

(72) Inventors: Jin Yang, Pleasanton, CA (US); Jonathan C. Pistorino, Oakland, CA (US); Russell Clayton Pratt, San Mateo, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 28 days.

(21) Appl. No.: 15/164,709

(22) Filed: May 25, 2016

(65) Prior Publication Data
US 2016/0336620 A1    Nov. 17, 2016

Related U.S. Application Data

(63) Continuation of application No. PCT/US2016/030602, filed on May 3, 2016.
(Continued)

(51) Int. Cl.
*H01M 10/0565* (2010.01)
*C08G 81/00* (2006.01)
(Continued)

(52) U.S. Cl.
CPC ........ *H01M 10/0565* (2013.01); *C08G 81/00* (2013.01); *H01M 4/137* (2013.01);
(Continued)

(58) Field of Classification Search
CPC ......... H01M 10/0565; H01M 10/0562; H01M 10/0525; H01M 4/604; H01M 4/137;
(Continued)

(56) References Cited

U.S. PATENT DOCUMENTS

| | | |
|---|---|---|
| 2002/0110739 A1 | 8/2002 | McEwen et al. |
| 2002/0127475 A1 | 9/2002 | Marchionni et al. |

(Continued)

FOREIGN PATENT DOCUMENTS

| | | |
|---|---|---|
| JP | 2009206004 A | 9/2009 |
| WO | 2007142731 A2 | 12/2007 |

(Continued)

OTHER PUBLICATIONS

International Search Report for PCT/US16/31685, dated Aug. 16, 2016.
(Continued)

*Primary Examiner* — Stewart A Fraser
(74) *Attorney, Agent, or Firm* — R'Sue Popowich Caron

(57) ABSTRACT

Syntheses of alternating copolymers based on PEO and fluorinated polymers are described. Introduction of fluorinated polymer chains reduces the $T_m$ of PEO and also increases the affinity and miscibility with ionic liquids, which improves ionic conductivity even at room temperature. The disclosed polymers containing PFPE have superior safety and are more flame retardant as compared to traditional electrolytes. Such alternating copolymers can be used as solid or gel electrolytes in Li batteries.

18 Claims, 3 Drawing Sheets

Related U.S. Application Data

(60) Provisional application No. 62/160,375, filed on May 12, 2015.

(51) Int. Cl.
  *H01M 4/137* (2010.01)
  *H01M 4/60* (2006.01)
  *H01M 10/0525* (2010.01)
  *H01M 10/0562* (2010.01)
  *H01M 4/134* (2010.01)
  *H01M 4/136* (2010.01)
  *H01M 4/58* (2010.01)
  *H01M 4/38* (2006.01)

(52) U.S. Cl.
  CPC ....... *H01M 4/604* (2013.01); *H01M 10/0525* (2013.01); *H01M 10/0562* (2013.01); *H01M 4/134* (2013.01); *H01M 4/136* (2013.01); *H01M 4/382* (2013.01); *H01M 4/58* (2013.01); *H01M 2300/0068* (2013.01); *H01M 2300/0082* (2013.01)

(58) Field of Classification Search
  CPC .. H01M 2300/0082; H01M 2300/0068; C08G 81/00
  See application file for complete search history.

(56) References Cited

U.S. PATENT DOCUMENTS

| | | | |
|---|---|---|---|
| 2003/0049538 | A1 | 3/2003 | Buerger et al. |
| 2003/0181572 | A1 | 9/2003 | Tan et al. |
| 2004/0170901 | A1 | 9/2004 | Blau et al. |
| 2007/0178133 | A1 | 8/2007 | Rolland |
| 2008/0114143 | A1 | 5/2008 | Brothers et al. |
| 2009/0004568 | A1 | 1/2009 | Hirose et al. |
| 2009/0023038 | A1 | 1/2009 | DeSimone et al. |
| 2009/0029249 | A1 | 1/2009 | Takami et al. |
| 2011/0111308 | A1 | 5/2011 | Halalay et al. |
| 2011/0281173 | A1 | 11/2011 | Singh et al. |
| 2012/0121989 | A1 | 5/2012 | Roberts et al. |
| 2013/0063092 | A1 | 3/2013 | Yang et al. |
| 2013/0130069 | A1 | 5/2013 | Mullin et al. |
| 2013/0228950 | A1 | 9/2013 | DeSimone et al. |
| 2013/0273419 | A1 | 10/2013 | Pistorino et al. |
| 2014/0221689 | A1 | 8/2014 | Klun et al. |
| 2016/0028114 | A1 | 1/2016 | Pratt et al. |
| 2016/0093895 | A1 | 3/2016 | Du et al. |
| 2016/0211498 | A1* | 7/2016 | Kim .................... H01M 2/1686 |
| 2016/0221926 | A1 | 8/2016 | Teran et al. |
| 2016/0226101 | A1 | 8/2016 | Teran et al. |
| 2016/0226102 | A1 | 8/2016 | Teran et al. |
| 2016/0226103 | A1 | 8/2016 | Teran et al. |
| 2016/0329613 | A1* | 11/2016 | Kusachi ............. H01M 10/052 |
| 2017/0117583 | A1* | 4/2017 | Matsuno ........... H01M 10/0525 |

FOREIGN PATENT DOCUMENTS

| | | |
|---|---|---|
| WO | 2010083325 A1 | 7/2010 |
| WO | 2011051275 A1 | 5/2011 |
| WO | 2014190278 A1 | 11/2014 |
| WO | 2014204547 A2 | 12/2014 |
| WO | 2015022229 A1 | 2/2015 |

OTHER PUBLICATIONS

International Search Report for PCT/US2016/025950, dated Jun. 27, 2016.
International Search Report for PCT/US2016/030602.
International Search Report for PCT/US2016/032541.
International Search Report for PCT/US2016/033967 dated Aug. 23, 2016.
Wong et al.: Nonflammable perfluoropolyether-based electrolytes for lithium batteries. PNAS. 111, 9. 3327-3331; Mar. 4, 2014. [retrieved on May 18, 2016}. Retrieved from the Internet. <URL: http://www.pnas.org/contentl111/9/3327.full.pdf>. entire document.
Smart. "Improved performance of lithium-ion cells with the use of fluorinated carbonate-based electrolytes," Journal of Power Sources 119-121 (2003) 359-367.

* cited by examiner

COPOLYMERS OF PEO AND FLUORINATED POLYMERS AS ELECTROLYTES FOR LITHIUM BATTERIES

CROSS-REFERENCE TO RELATED APPLICATIONS

This application is a continuation of International Application PCT/US2016/030602, filed May 3, 2016, which claims priority to U.S. Provisional Patent Application 62/160,375, filed May 12, 2015, both of which are incorporated by reference herein.

BACKGROUND OF THE INVENTION

Field of the Invention

This invention relates generally to copolymers that contain polyethylene oxide, and, more specifically, to electrolytes that employ such polymers.

Poly(ethylene oxide) (PEO) is a well-known polymer electrolyte for lithium ion batteries due to its ability to dissolve lithium salts and its relatively high ionic conductivity at elevated temperatures. However, ionic conductivity of PEO at room temperature is about $10^{-5}$ S/cm, which is below ionic conductivities (greater than $10^{-3}$ S/cm) that are desirable for commercial applications. Low PEO ionic conductivity may be due to its crystalline nature at room temperature. Above about 55° C., the melting temperature ($T_m$) of PEO, the ionic conductivity reach values of $10^{-4}$ S/cm or more.

Perfluoropolyethers (PFPE) are low $T_g$ (less than $-100°$ C.), non-flammable and chemically inert polymers, which makes them excellent candidates for electrolytes in electrochemical cells. Unfortunately they also have low dielectric constants (DCs), which make them unsuitable as electrolytes for electrochemical cells because they don't dissolve salts well.

It would be useful to find a way to combine PEO and PFPE polymers to make electrolytes that exploit the useful properties of each.

SUMMARY

An alternating copolymer is disclosed in the embodiments of the invention. The alternating copolymer has a plurality of ionically-conductive segments; and a plurality of fluorinated polymer segments. The ionically-conductive segments may include carbonate. The ionically-conductive segments may include PEO. In one arrangement, the ionically-conductive segments include both carbonate and PEO. In another arrangement, the ionically-conductive segments include amide and PEO. The alternating copolymer may also include a metal salt, such as a lithium salt. The alternating copolymer may also include an ionic liquid.

The PEO may have a molecular weight between 200 and 400,000 Da. The fluorinated polymer segments may have molecular weights between 200 and 400,000 Da.

The fluorinated polymer segments may be one or more of fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof. The perfluoropolyether may include a segment such as difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

In one embodiment of the invention, the alternating copolymer forms the first block of a block copolymer. A second polymer that has a modulus in excess of $1 \times 10^5$ Pa at 25° C. forms the second block. The first blocks may associate to form a first domain and the second blocks may associate to form a second domain, so that together, the first domain and the second domain form an ordered nanostructure. In one arrangement, the second polymer has a modulus in excess of $1 \times 10^5$ Pa at 80° C. The block copolymer may also include a metal salt, such as a lithium salt. The block copolymer may also include an ionic liquid. The block copolymer may be either a diblock copolymer or a triblock copolymer.

The second polymer may be any of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

In another embodiment of the invention a battery cell is disclosed. The cell has an anode containing lithium metal, a cathode containing cathode active material and a first electrolyte, and a separator containing a second electrolyte. The first electrolyte includes an alternating copolymer that has a plurality of ionically-conductive PEO segments, a plurality of fluorinated polymer segments, and a metal salt. In one arrangement, the fluorinated polymers make up less than 10 mol % of the polymer. In one arrangement, the second electrolyte is an alternating copolymer made of a plurality of ionically-conductive PEO segments, a plurality of fluorinated polymer segments, and a metal salt.

In another embodiment of the invention an electrode that is an anode is provided. The anode includes anode active material and an alternating copolymer electrolyte made of a plurality of ionically-conductive PEO segments, a plurality of fluorinated polymer segments, and a metal salt. The fluorinated polymers in the fluorinated polymer segments may make up less than 10 mol % of the polymer.

In another embodiment of the invention an electrode that is a cathode is provided. The cathode includes cathode active material and an alternating copolymer electrolyte made of a plurality of ionically-conductive PEO segments, a plurality of fluorinated polymer segments, and a metal salt. The fluorinated polymers in the fluorinated polymer segments may make up less than 10 mol % of the polymer.

In another embodiment of the invention, a block copolymer electrolyte is provided. The block copolymer electrolyte includes a first block comprising an ionically conductive alternating copolymer as described above, a second block comprising a polymer that has a modulus in excess of $1 \times 10^5$ Pa at 25° C.; and a metal salt, such as a lithium salt. The block copolymer is either a diblock copolymer or a triblock copolymer.

The second block of the block copolymer may be any of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly (cyclohexyl vinyl ether), poly(t-butyl vinyl ether), polyethylene, fluorocarbons, polyvinylidene fluoride, and copolymers that contain styrene, methacrylate, and/or vinylpyridine.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1A:
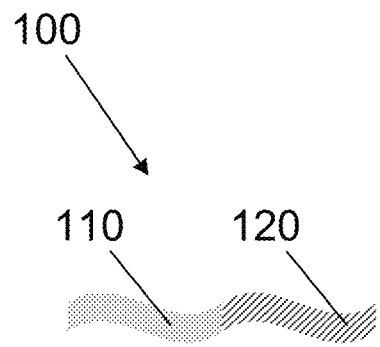
FIG. 1A is a simplified illustration of an exemplary diblock polymer molecule.

The preferred embodiments are illustrated in the context of electrolyte materials in a lithium battery cell. The skilled artisan will readily appreciate, however, that the materials and methods disclosed herein will have application in a number of other contexts where high ionic conductivity is desirable, particularly where low temperature is important.

These and other objects and advantages of the present invention will become more fully apparent from the following description taken in conjunction with the accompanying drawings.

Molecular weights in this disclosure have been determined by the weight-averaged method. Some abbreviations used in this disclosure are shown in Table I below.

TABLE I

| Abbreviation | Meaning |
| --- | --- |
| PEO | poly(ethylene oxide) |
| PFPE | perfluoropolyether |
| PFA | perfluoro alkane |
| PEG | polyethylene glycol |
| PAGE | polyallyl glycidyl ether |
| PPO | polypropylene oxide |
| $^1$H NMR | proton nuclear magnetic resonance spectroscopy |

TABLE I-continued

| Abbreviation | Meaning |
| --- | --- |
| GPC | gel permeation chromatography |
| DSC | differential scanning calorimetry |

In one embodiment of the invention, an alternating copolymer that includes both ionically-conductive segments and fluorinated polymer segments is disclosed. The ionically-conductive segments may be carbonate, or PEO, or both.

Formation of PFPE-PEO Alternating Copolymers

In one embodiment of the invention, an alternating copolymer based on PFPE and PEO can be obtained by reacting a PFPE-diol (nucleophile) with an electrophilic PEG molecule as shown in Scheme 1 below. This reaction uses a base to activate the alcohols in PFPE. The molecular weight of the resulting copolymer can be tuned by controlling the stoichiometry between the PFPE nucleophile and PEO-based electrophile. The relative amounts of PFPE and PEG in the final copolymer can be controlled by varying the molecular weight of the two components. The PEO may have a molecular weight between 200 and 400,000 Da or any range subsumed therein. The fluorinated polymer segments may have molecular weights between 200 and 400,000 Da or any range subsumed therein. PFPE-PEO alternating copolymers may be solid, gels, or liquids depending on their molecular weights.

Scheme 1 below can be used to synthesize other variations of PEG or PEO such as polypropylene oxide (PPO) or polyallyl glycidyl ether (PAGE). Values for r can range from 1 to 10,000; for s from 1 to 10,000; and for t from 1 to 10,000. Also, PEO with small amounts of cross-linkable monomers can be utilized to achieve a cross-linked electrolyte. Examples of such cross-linkable monomers (such as X) include, but are not limited to, oxiranes with pendant epoxide groups, allyl groups, acrylate groups, methacrylate groups, and combinations thereof.

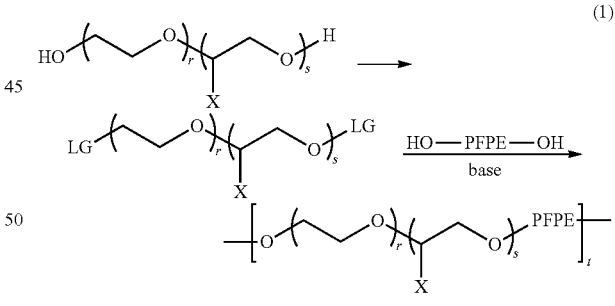

PFPE-alt-PEO copolymer
X = H, Me, —CH$_2$CH$_3$, or CH$_2$—O—CH$_2$—CH═CH$_2$
LG = Cl, Br, I, Ms or Ts In one embodiment of the invention, an alternating copolymer based on PFPE and PEO can be obtained by reacting a PFPE-methyl ester with PEG diamine molecule as shown in Scheme 2 below. This reaction uses amine function groups on PEG to react with methyl esters on PFPE to form amide linkages. The molecular weight of the resulting copolymer can be tuned by controlling the stoichiometry between the PFPE methyl ester and PEO-based diamine. The relative amounts of PFPE and PEG in the final copolymer can be controlled by varying the molecular weights of the two components. The PEO may have a molecular weight between 200 and 400,000 Da or any range subsumed therein. The fluorinated polymer segments may have molecular weights between 200 and 400,000 Da or any range subsumed therein. PFPE-PEO alternating copolymers may be solid, gels, or liquids depending on their molecular weights.

Scheme 2 below can be used to synthesize variations of PEG or PEO such as polypropylene oxide (PPO) or polyallyl glycidyl ether (PAGE) with diamine functional groups. The PEG or PEO diamine can be reacted with ester-functionalized PFPE to form amide linkages between the PEG or PEO and the PFPE. Values for r can range from 1 to 10,000; for s from 1 to 10,000; and for t from 1 to 10,000. Also, PEO or PEG with small amounts of cross-linkable monomers (such as X) can be utilized to achieve a cross-linked electrolyte. Examples of such cross-linkable monomers include, but are not limited to, oxiranes with pendant epoxide groups, allyl groups, acrylate groups, methacrylate groups, and combinations thereof.

phosgene (ClC(O)Cl) can be used to generate the copolymer, however; excess base is used to scavenge HCl, which is liberated during the reaction.

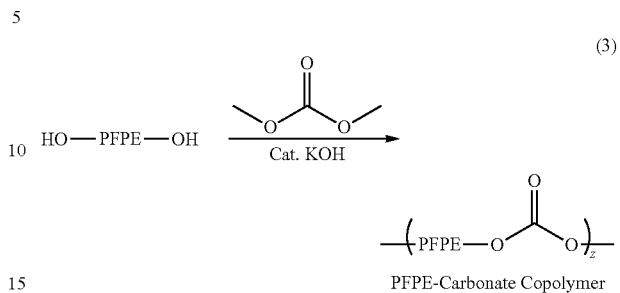

(3)

In other arrangements, fluorinated polymers other than PFPE can be used to form alternating copolymers with carbonate. Examples include, but are not limited to, and (2)

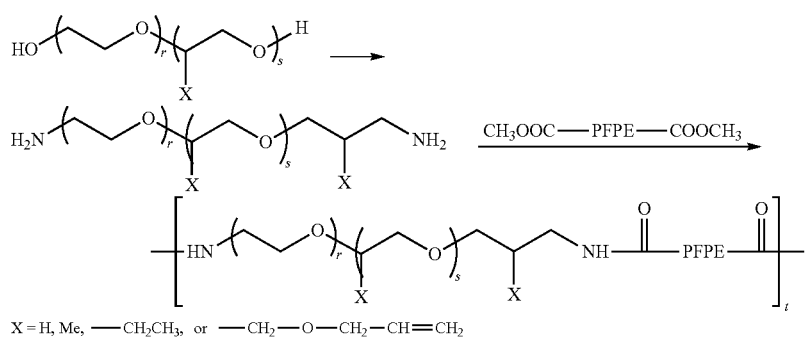

In other arrangements, fluorinated polymers other than PFPE can be used to form alternating copolymers with PEO. Examples include, but are not limited to, fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

In one embodiment of the invention, alternating copolymers based on PFPE and PEO are combined with metal salts to form ionically-conductive electrolytes. Some useful metal salts are listed below.

Formation of PFPE-Carbonate Alternating Copolymers

Scheme 3 below describes syntheses of PFPE-carbonate alternating copolymers using a simple polycondensation involving dimethyl carbonate and PFPE-diol. This reaction uses a catalytic amount of a base such as KOH or NaOH to activate the hydroxyl groups in PFPE. Values for z can range from 1 to 10,000. By controlling the molecular weight of PFPE, the ratio of PFPE to carbonate can be controlled, which in turn can be used to tune the dielectric constant of the final material. Instead of using dimethyl carbonate, perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof.

The fluorinated polymer segments may have molecular weights between 200 and 400,000 Da or any range subsumed therein. PFPE-carbonate alternating copolymers may be solid, gels, or liquids depending on their molecular weights.

In one embodiment of the invention, alternating copolymers based on PFPE and carbonate are combined with metal salts to form ionically-conductive electrolytes. Some useful metal salts are listed below.

Formation of PFPE-Carbonate-PEO Alternating Copolymers

Scheme 4 below describes syntheses of PFPE-carbonate-PEO alternating copolymers using a simple polycondensation involving dimethyl carbonate, PEO-diol, and PFPE-diol. Values for x can range from 5 to 10,000 and for y from 1 to 1,000.

(4)

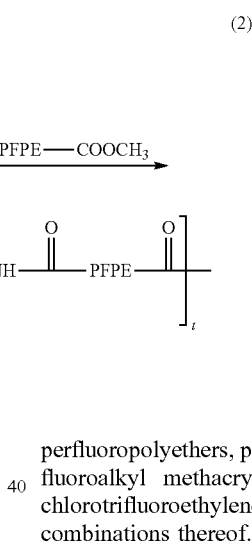

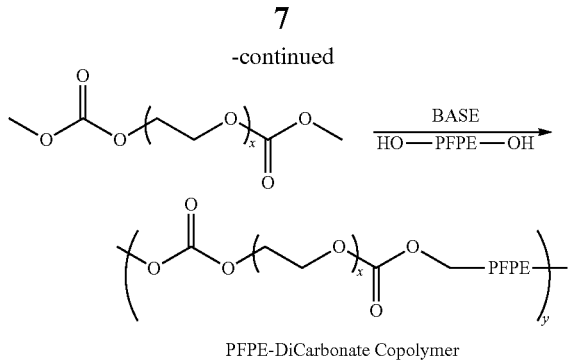

PFPE-DiCarbonate Copolymer

By controlling the molecular weight of PFPE and the molecular weight of PEO, the ratio of PFPE to conductive segments can be controlled, which in turn can be used to tune the dielectric constant of the final material. Instead of using dimethyl carbonate, phosgene (ClC(O)Cl) can be used to generate the copolymer, however; excess base is used to scavenge HCl, which is liberated during the reaction.

In other arrangements, fluorinated polymers other than PFPE can be used to form alternating copolymers with carbonate and PEO. Examples include, but are not limited to, fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and combinations thereof.

The PEO may have a molecular weight between 200 and 400,000 Da or any range subsumed therein. The fluorinated polymer segments may have molecular weights between 200 and 400,000 Da or any range subsumed therein. PFPE-carbonate-PEO alternating copolymers may be solid, gels, or liquids depending on their molecular weights.

In one embodiment of the invention, alternating copolymers based on PFPE, PEO, and carbonate are combined with metal salts to form ionically-conductive electrolytes. Some useful metal salts are listed below.

Ionic liquids have been demonstrated as a class of plasticizers that increase ionic conductivity of polymer electrolytes such as PEO. It has been demonstrated that the ionic conductivity of PEO can be increased by the addition of ionic liquid, with the increase being proportional to the amount of ionic liquid added.

In one embodiment of the invention, when the alternating copolymers described above are mixed with ionic liquids they have higher ionic conductivity at low temperatures as compared to the copolymers without ionic liquid, as would be expected Nanostructured Block Copolymer Electrolytes In one embodiment of the invention, a solid polymer electrolyte, when combined with an appropriate salt, is chemically and thermally stable and has an ionic conductivity of at least $10^{-5}$ Scm$^{-1}$ at operating temperature. In one arrangement, the polymer electrolyte has an ionic conductivity of at least $10^{-3}$ Scm$^{-1}$ at operating temperature. Examples of useful operating temperatures include room temperature (25° C.) and 80° C.

Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiDFOB, and mixtures thereof. In other embodiments of the invention, for other electrochemistries, electrolytes are made by combining the polymers with various kinds of salts. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$. As described in detail above, a block copolymer electrolyte can be used in the embodiments of the invention.

FIG. 1A is a simplified illustration of an exemplary diblock polymer molecule 100 that has a first polymer block 110 and a second polymer block 120 covalently bonded together. In one arrangement both the first polymer block 110 and the second polymer block 120 are linear polymer blocks. In another arrangement, either one or both polymer blocks 110, 120 has a comb (or branched) structure. In one arrangement, neither polymer block is cross-linked. In another arrangement, one polymer block is cross-linked. In yet another arrangement, both polymer blocks are cross-linked.

Figure 1B:
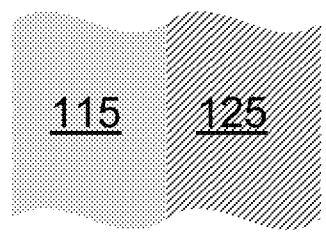
FIG. 1B is a simplified illustration of multiple diblock polymer molecules as shown in FIG. 1A arranged to form a domain structure
Figure 1C:
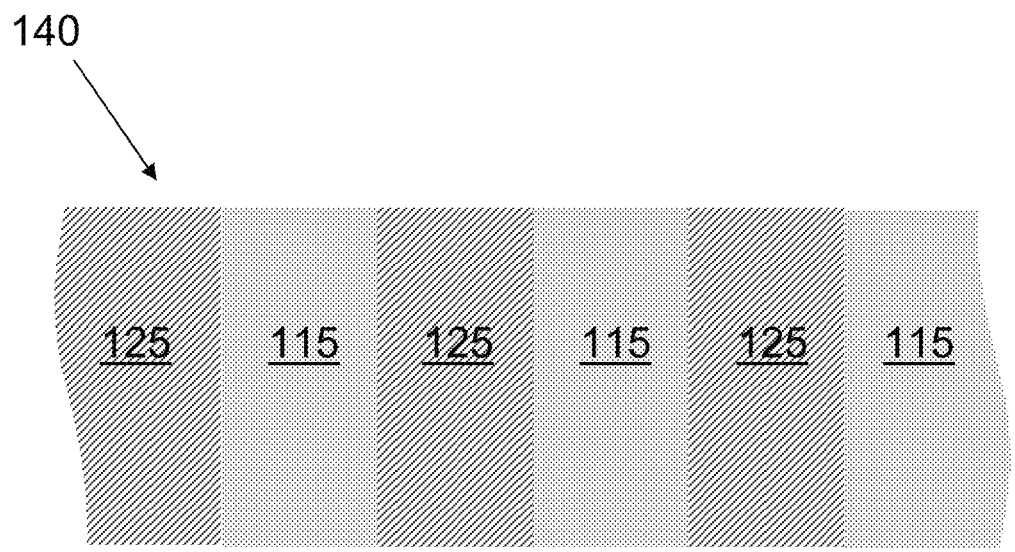
FIG. 1C is a simplified illustration of multiple domain structures as shown in FIG. 1B arranged to form multiple repeat domains, thereby forming a continuous nanostructured block copolymer material.

Multiple diblock polymer molecules 100 can arrange themselves to form a first domain 115 of a first phase made of the first polymer blocks 110 and a second domain 125 of a second phase made of the second polymer blocks 120, as shown in FIG. 1B. Diblock polymer molecules 100 can arrange themselves to form multiple repeat domains, thereby forming a continuous nanostructured block copolymer material 140, as shown in FIG. 1C. The sizes or widths of the domains can be adjusted by adjusting the molecular weights of each of the polymer blocks. In various embodiments, the domains can be lamellar, cylindrical, spherical, or gyroidal depending on the nature of the two polymer blocks and their ratios in the block copolymer.

In one arrangement the first polymer domain 115 is ionically conductive, and the second polymer domain 125 provides mechanical strength to the nanostructured block copolymer.

Figure 2A:
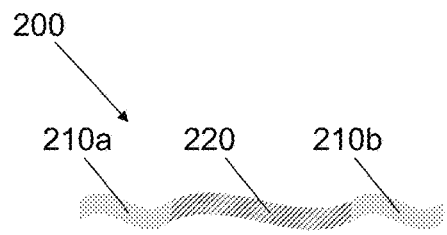
FIG. 2A is a simplified illustration of an exemplary triblock polymer molecule, wherein two blocks are the same.

FIG. 2A is a simplified illustration of an exemplary triblock polymer molecule 200 that has a first polymer block 210a, a second polymer block 220, and a third polymer block 210b that is the same as the first polymer block 210a, all covalently bonded together. In one arrangement the first polymer block 210a, the second polymer block 220, and the third copolymer block 210b are linear polymer blocks. In another arrangement, either some or all polymer blocks 210a, 220, 210b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 2B:
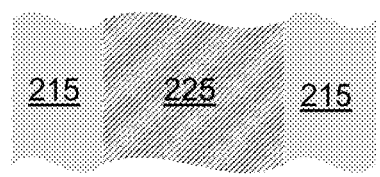
FIG. 2B is a simplified illustration of multiple triblock polymer molecules as shown in FIG. 2A arranged to form a domain structure
Figure 2C:
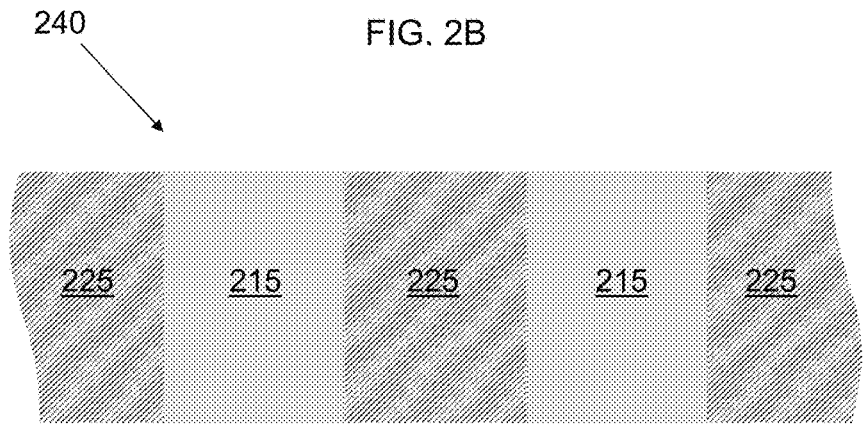
FIG. 2C is a simplified illustration of multiple domain structures as shown in FIG. 2B arranged to form multiple repeat domains, thereby forming a continuous nanostructured block copolymer material.

Multiple triblock polymer molecules 200 can arrange themselves to form a first domain 215 of a first phase made of the first polymer blocks 210a, a second domain 225 of a second phase made of the second polymer blocks 220, and a third domain 215 of a first phase made of the third polymer blocks 210b as shown in FIG. 2B. Triblock polymer molecules 200 can arrange themselves to form multiple repeat domains 225, 215 (containing both 215a and 215b), thereby forming a continuous nanostructured block copolymer material 240, as shown in FIG. 2C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first and third polymer domains 215 are ionically conductive, and the second polymer domain 225 provides mechanical strength to the nanostructured block copolymer. In another arrangement, the second polymer domain 225 is ionically conductive, and the first and third polymer domains 215 provide a structural framework.

Figure 3A:
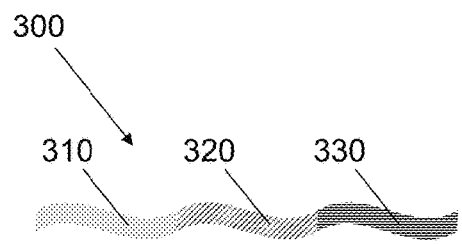
FIG. 3A is a simplified illustration of an exemplary triblock polymer molecule, wherein no two blocks are the same.

FIG. 3A is a simplified illustration of another exemplary triblock polymer molecule 300 that has a first polymer block 310, a second polymer block 320, and a third polymer block 330, different from either of the other two polymer blocks, all covalently bonded together. In one arrangement the first polymer block 310, the second polymer block 320, and the third copolymer block 330 are linear polymer blocks. In another arrangement, either some or all polymer blocks 310, 320, 330 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 3B:
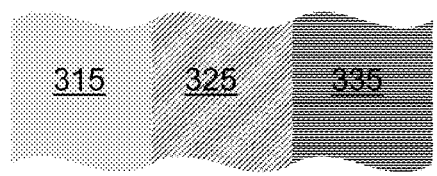
FIG. 3B is a simplified illustration of multiple triblock polymer molecules as shown in FIG. 3A arranged to form a domain structure
Figure 3C:
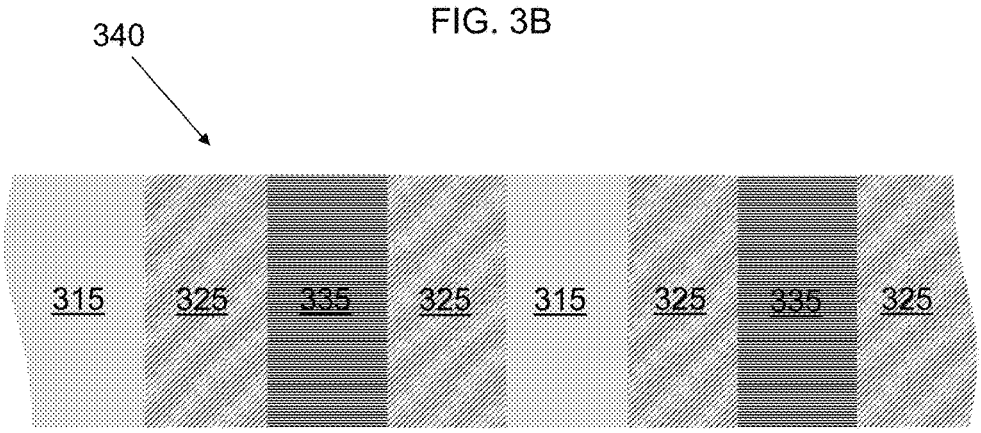
FIG. 3C is a simplified illustration of multiple domain structures as shown in FIG. 3B arranged to form multiple repeat domains, thereby forming a continuous nanostructured block copolymer material.

Multiple triblock polymer molecules 300 can arrange themselves to form a first domain 315 of a first phase made of the first polymer blocks 310a, a second domain 325 of a second phase made of the second polymer blocks 320, and a third domain 335 of a third phase made of the third polymer blocks 330 as shown in FIG. 3B. Triblock polymer molecules 300 can arrange themselves to form multiple repeat domains, thereby forming a continuous nanostructured block copolymer material 340, as shown in FIG. 3C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first polymer domains 315 are ionically conductive, and the second polymer domains 325 provide mechanical strength to the nanostructured block copolymer. The third polymer domains 335 provides an additional functionality that may improve mechanical strength, ionic conductivity, electrical conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In another embodiment the conductive polymer exhibits ionic conductivity of at least $10^{-3}$ Scm$^{-1}$ at electrochemical cell operating temperatures, such as at 25° C. or at 80° C. when combined with an appropriate salt(s). In one embodiment, the structural material has a modulus in excess of $1\times10^5$ Pa at electrochemical cell operating temperatures. In one embodiment, the structural material has a modulus in excess of $1\times10^7$ Pa at electrochemical cell operating temperatures. In one embodiment, the structural material has a modulus in excess of $1\times10^9$ Pa at electrochemical cell operating temperatures. In one embodiment, the third polymer (1) is rubbery; and (2) has a glass transition temperature lower than operating and processing temperatures. It is useful if all materials are mutually immiscible. In one embodiment the block copolymer exhibits ionic conductivity of at least $10^{-4}$ Scm$^{-1}$ and has a modulus in excess of $1\times10^7$ Pa or $1\times10^8$ Pa at electrochemical cell operating temperatures. Examples of cell operating temperatures are 25° C. and 80° C.

In one embodiment of the invention, the conductive phase can be made of any of the electrolytes disclosed above, such PFPE-PEO alternating copolymers, PFPE-carbonate alternating copolymers, PFPE-carbonate-PEO alternating copolymers, or variations thereof. In general, block copolymer made using these conductive phases are solid.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof. Non-lithium salts such as salts of aluminum, sodium, and magnesium are examples of other salts that can be used with their corresponding metals.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly (cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine. It is especially useful if the structural phase is rigid and is in a glassy or crystalline state.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interphase) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Electrochemical Cells

In other embodiments of the invention, the electrolytes disclosed herein, can be used in various parts of an electrochemical cell such as a battery.

In one arrangement, the electrolytes can be used as anolytes only in the anode or negative electrode. The anolytes can be mixed with an anode active material, such as graphite, to form an anode for use with a lithium battery. The anolyte may include an alternating copolymer that has a plurality of ionically-conductive PEO segments, a plurality of fluorinated polymer segments, and a metal salt. In one arrangement, the fluorinated polymer segments make up less than 10 mol % of the polymer.

The negative electrode active material can be any of a variety of materials depending on the type of chemistry for which the cell is designed. In one embodiment of the invention, the cell is a lithium or lithium ion cell. The negative electrode material can be any material that can serve as a host material (i.e., can absorb and release) lithium ions. Examples of such materials include, but are not limited to graphite, lithium titanate, lithium metal, and lithium alloys such as Li—Al, Li—Si, Li—Sn, and Li—Mg. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

In another arrangement, the electrolytes can be used as catholytes only in the cathode or positive electrode. The electrolytes can be mixed with a cathode active material, such as listed below, to form a cathode for use with a lithium battery. The catholyte may include an alternating copolymer that has a plurality of ionically-conductive PEO segments, a plurality of fluorinated polymer segments, and a metal salt. In one arrangement, the fluorinated polymer segments make up less than 10 mol % of the polymer.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \le x \le 1.1$; and y is described by $0 \le y \le 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \le x \le 1.1$; and y is described by $0 \le y \le 2$. In another arrangement, the positive electrode active material is described by the general formula: $Li_xM_yMn_{4-y}O_8$, where M is chosen from Fe and/or Co; x is described by $0.05 \le x \le 2$; and y is described by $0 \le y \le 4$. In another arrangement, the positive electrode active material is given by the general formula $Li_x(Fe_yM_{1-y})PO_4$, where M is chosen from transition metals such as Mn, Co and/or Ni; x is described by $0.9 \le x \le 1.1$; and y is described by $0 \le y \le 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \le x \le 0.2$. In some arrangements, the positive electrode material includes $LiNiVO_2$.

In yet another embodiment of the invention, the electrolytes can be used in the separator of a battery, providing a medium for ionic communication between the anode and the cathode. If the electrolyte is liquid or a gel, it may be used with a separator membrane, such as Celgard®, as is know in the art. If the electrolyte is a solid or a high-viscosity gel, it may be used without a separator membrane. In one arrangement, the electrolyte in the separator is an alternating copolymer made of a plurality of ionically-conductive PEO segments, a plurality of fluorinated polymer segments, and a metal salt.

Combinations of the above uses are also possible. In one arrangement, the electrolytes are used in all parts of the battery. In another arrangement, the electrolytes are used in the cathode and in the separator with a lithium metal or lithium alloy foil anode.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An alternating copolymer comprising:
a plurality of ionically-conductive segments; and
a plurality of fluorinated polymer segments;
wherein the fluorinated polymer segments comprise perfluoropolyethers;
wherein the perfluoropolyethers includes a segment selected from the group consisting of difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide and combinations thereof.

2. The alternating copolymer of claim 1 wherein the ionically-conductive segments comprise carbonate.

3. The alternating copolymer of claim 1 wherein the ionically-conductive segments comprise PEO or PPO.

4. The alternating copolymer of claim 3 wherein the PEO further comprises cross-linkable monomers selected from the group consisting of oxiranes with pendant epoxide groups, allyl groups, acrylate groups, methacrylate groups, and combinations thereof.

5. The alternating copolymer of claim 1 wherein the ionically-conductive segments comprise carbonate and PEO.

6. The alternating copolymer of claim 1 wherein the ionically-conductive segments comprise amide and PEO.

7. The alternating copolymer of claim 1 wherein the fluorinated polymer segments have molecular weights between 200 and 400,000 Da.

8. The alternating copolymer of claim 1 further comprising a metal salt.

9. The alternating copolymer of claim 1, further comprising:
a second polymer that has a modulus in excess of $1\times10^5$ Pa at 25° C.;
wherein the alternating copolymer of claim 1 forms a first block of a block copolymer and the second polymer forms a second block of a block copolymer.

10. The alternating copolymer of claim 9 further comprising a plurality of the block copolymers, wherein the block copolymers comprise a plurality of first blocks and second blocks, wherein the first block associates to form a first domain and the second block associates to form a second domain, and together, the first domain and the second domain form an ordered nanostructure.

11. The alternating copolymer of claim 9 wherein the second polymer has a modulus in excess of $1\times10^5$ Pa at 80° C.

12. The alternating copolymer of claim 9 wherein the second polymer is selected from the group consisting of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly (cyclohexyl vinyl ether), poly(t-butyl vinyl ether), polyethylene, fluorocarbons, polyvinylidene fluoride, and copolymers that contain styrene, methacrylate, and/or vinylpyridine.

13. A battery cell, comprising:
an anode comprising lithium metal;
a cathode comprising cathode active material and a first electrolyte, comprising;
the alternating copolymer of claim 1; and
a metal salt; and
a separator comprising a second electrolyte.

14. The cell of claim 13 wherein the fluorinated polymers segments compose less than 10 mol % of the alternating copolymer.

15. The cell of claim 13 wherein the second electrolyte comprises:
the alternating copolymer of claim 1; and
a metal salt.

16. An electrode comprising:
electrode active material;
the alternating copolymer of claim 1; and
a metal salt.

17. The electrode of claim 16 wherein the fluorinated polymer segments compose less than 10 mol % of the alternating copolymer.

18. A block copolymer electrolyte comprising:
a first block comprising;
the alternating copolymer of claim 1; and
a lithium salt; and
a second block comprising a polymer that has a modulus in excess of $1\times10^5$ Pa at 25° C.

* * * * *